United States Patent [19]

Metzger

[11] Patent Number: 4,986,328

[45] Date of Patent: Jan. 22, 1991

[54] TIRE MOUNTING DEVICE

[75] Inventor: Kai Metzger, Moosinning, Fed. Rep. of Germany

[73] Assignee: Stahlgruber Otto Gruber GmbH & Co., Munich, Fed. Rep. of Germany

[21] Appl. No.: 411,454

[22] PCT Filed: Dec. 22, 1988

[86] PCT No.: PCT/EP88/01193

§ 371 Date: Sep. 14, 1989

§ 102(e) Date: Sep. 14, 1989

[87] PCT Pub. No.: WO89/06604

PCT Pub. Date: Jul. 27, 1989

[30] Foreign Application Priority Data

Jan. 14, 1988 [DE] Fed. Rep. of Germany ....... 8800372

[51] Int. Cl.$^5$ .............................................. B60C 25/07
[52] U.S. Cl. .................................. 157/1.24; 157/1.28; 157/16
[58] Field of Search .................. 157/1.1, 1.17, 1.2, 157/1.24, 1.26, 1.28, 14, 16, 17, 19, 20, 21

[56] References Cited

U.S. PATENT DOCUMENTS 3,815,653  6/1974  Scott et al. ........................ 157/1.24
4,694,875  9/1987  Goebel ............................... 157/1.24

Primary Examiner—D. S. Meislin
Attorney, Agent, or Firm—Browdy and Neimark

[57] ABSTRACT

An apparatus for mounting a tire on a rim and removing it therefrom has a device for rotating the rim, which is embodied as a pneumatic motor having a rotor and a stator with radially arranged piston/cylinder units and cams disposed on a circle, a device for firmly holding the rim of self-centering arms that are pivotable via the pneumatic motor, a device for forcing the bead edges of the tire into the rim bed that comprises rollers acting simultaneously on both beads, and a device for pulling the bead edges from or onto the rim, with an element for bracing against the wheel flange. Via the hydraulic motor that drives the arms of the holding or chucking device, a rim is firmly held and once it is firmly clamped is rotated via the motor. The apparatus is operated completely pneumatically.

32 Claims, 12 Drawing Sheets

TIRE MOUNTING DEVICE

BACKGROUND OF THE INVENTION

1. Field of the Invention

The invention relates to an apparatus for mounting and unmounting a tire on a rim, having a device for firmly holding the rim, a motor for rotating the rim, a device for pulling the bead edges of the tire over the wheel flange, and a device for forcing the bead edges of the tire into the rim bed.

2. The Prior Art

A tire mounting apparatus is known in which a rim is firmly gripped with clamping claws on the table of a clamping fixture. The rim is rotated via an electric motor, which is provided with a transmission, so that a tire mounting tool introduced between the wheel flange and the bead of the tire pulls the tire off the rim or pulls it onto the rim, as applicable. The bed of the rim is used for this process. Three or four self-centering clamping claws of the clamping fixture lock the rim from the inside on the rim key, or from the outside on the wheel flange. The clamping fixture must assure that the rim is centered exactly so that the tire mounting tool always remains spaced apart from the wheel flange during the rotation of the rim. The clamping claws are controlled via pneumatic cylinders.

The first step in removing a tire is to force the beads of the tire into the bed of the rim, from their seat on the wheel flange, by means of a forcing tool. As a rule this tool is mounted on the side of the apparatus and is actuated via a pneumatic piston/cylinder unit. To force a tire off a rim, the forcing tool must be used at several points on both sides of the tire, and after being forced off on one side the tire has to be turned over. The forcing tool in the known apparatus requires considerable force, which is exerted on the side of the tire and is difficult to control.

Damage to the tire and rim cannot be precluded in that case. Especially with wide tires, it can often happen that in the process of forcing the tire off the rim the forcing tool can be forced into the bed of the rim, and can damage the rim bed.

The known tire mounting apparatus requires a great number for providing units of force, such as an electric motor and pneumatic piston/cylinder units. Also, a transmission between the electric motor and the rotating plate of the clamping fixture is indispensable. Furthermore, the known apparatus is complicated to use and is not always problem-free.

SUMMARY OF THE INVENTION

It is the object of the invention to devise a reliable, sturdy tire mounting apparatus that is easy to use, which needs only a single energy source, and which does not require complicated transmission mechanisms.

According to the invention, this object is attained in that the device for rotating the rim is a pneumatic motor having a rotor and stator with radially arranged piston/cylinder units and cams disposed on a circle; that the device for firmly holding the rim comprises self-centering arms that are pivotable via the pneumatic motor; that the device for forcing the bead edges of the tire into the rim bed comprises rollers acting simultaneously on both beads; and that the device for pulling the bead edges of the tire over a wheel flange has an element for bracing against the wheel flange.

In the apparatus according to the invention, an electric motor provided with a transmission is not used; instead, the rotation of the clamped rim is effected via a pneumatic motor, which is classified as a low-speed motor with high torque and is operated with compressed air. Unlike an electric motor provided with a transmission, such a pneumatic motor can bring high torque to bear at low rpm without limitation. This advantage is particularly important if a maximum torque must be developed beginning at the stationary device for firmly holding the rim, which with conventional electric motors always entails the risk of locking. The motor according to the invention is economical to manufacture, by comparison with an electric motor having a complicated transmission.

The pneumatic motor-driven self-centering apparatus for firmly holding or chucking a rim has a number of arms, in particular four, on which clamping claws are disposed with which the rim can be grasped from the outside on the wheel flange. Moreover, rubber elements may be disposed on the arms, in order to clamp the rim from the inside at the rim key. No additional unit of force is needed, since the pneumatic motor actuates both the clamping or holding apparatus and effects the rotation of the clamped rim.

For forcing the bead edges of a tire into the bed of the rim, two rollers acting simultaneously are provided. The forcing of the bead edges takes place with the rim, clamped on the clamping fixture, rotating. The forcing of the rim can thus be done with much less force being exerted, since the force can be brought to bear continuously, and, by rotating the rim, better initiation of force is possible.

The device for pulling the bead edges of a tire over a wheel flange has an element that is braced against the wheel flange. This makes it possible to dispense with a complicated support of the arm of the mounting tool, since the rim itself serves as an abutment. To avoid damage to the wheel flange, for instance with delicate aluminum rims, the element of this pulling device is made of some plastic that is gentle to other materials.

In a preferred embodiment, a roller for cooperation with the cams is provided on each piston of the pneumatic motor; the number of cams is not integrally divisible by the number of piston/cylinder units, and a control device is provided for alternately supplying the cylinders with compressed air and discharging it.

The control device for supplying the cylinders with compressed air and discharging it is embodied in particular as a frontal supply system, so that fine control of the pneumatic motor is possible. By a suitable selection of the number of both piston/cylinder units and cams, the control of the pneumatic motor can be effected in small increments, so that optimization of the speed at maximum torque is possible. All that is necessary is that at least one roller of a piston/cylinder unit be seated on the flank of a cam at all times, so that upon displacement of the piston of this piston/cylinder unit, a relative motion takes place between the piston/cylinder units and the cams.

Preferably the cylinders are embodied in a block. The block may comprise a suitable plastic, in which blind bores for receiving the pistons are provided. The cylinders are then radially disposed in the block.

The cams are preferably embodied on the inner circumferential surface of a housing.

According to the invention, it is possible to provide the piston/cylinder units on the rotor and the cams on the stator, or to dispose the cams on a rotor that then rotates around the stationary piston/cylinder units.

Preferably, the control device for supplying the compressed air to the piston/cylinder units and discharging it is provided on top of the arrangement of piston/cylinder units and has a number of supply and discharge openings for compressed air disposed on a circle, the number being equal to the number of cams, and annular grooves for supplying or discharging compressed air are provided in the housing half receiving the control device.

In a preferred embodiment, at least four piston/cylinder units and three cams are provided. Preferably, seven piston/cylinder units are radially disposed in the rotor, and the stator housing has twenty cams on the inner circumferential surface. Correspondingly, the control unit has twenty pressure inlet openings and twenty pressure outlet openings, so that a plurality of pistons acted upon by compressed air are always braced on flanks of the cams, and high torque is produced by the motor.

To enable the pneumatic motor to rotate both clockwise and counterclockwise, a control unit is preferably provided with which the compressed air supply and discharge can be transposed.

Further, the means for compressed air supply and discharge can be supplied with compressed air simultaneously in order to lock the pneumatic motor; this is necessary if the motor must be stopped and must not undergo any rotation during idling to make any necessary manipulation of the apparatus possible.

During the rotation of the pneumatic motor, an inlet bore of each piston is connected alternatively with an air supply or air discharge opening in the frontal control system. If the inlet bore is connected to the air supply opening, the piston is pressed against the cam profile, which is for instance disposed on the stator, and acts upon it with the roller disposed on its forward end. The pressure of the piston is exerted on the flank of the cam and effects a motion in the rotational direction. The number of pistons and cams is selected such that the torque generated by all the activated pistons executes a drive that is sufficient to perform one complete rotation about an angle of 360°, and in every phase of the motion a torque sufficient to carry out the function on the apparatus on which the motor is used is assured. With their inlet bores, the pistons that are not activated via compressed air communicate with the bore for draining the compressed air on the frontal control, system, so that during the rotation the pistons, with their rollers roll on cam flanks, and the pistons are displaced into the interior of the cylinder. The pistons are reversed whenever the roller of the piston reaches the lowermost point in a cam indentation or the uppermost point on a cam lobe, and the inlet bore for the cylinder of the applicable piston is located in the middle between an inlet and an outlet bore of the frontal control system.

If compressed air is supplied by means of a suitable control unit via the original compressed air outlet line, and compressed air is discharged from the cylinders via the original compressed air inlet line, a reversal of the motor takes place, or in other words, a change in the direction of rotation. The dimensions of the bores for the inlet and outlet of compressed air in the control system determines the speed of pressure inflow and outflow and thus the speed of the motor. If both the inlet and outlet lines for compressed air are supplied with compressed air, the motor is actively locked, and rotation during idling is not possible.

In a preferred embodiment, a worm is disposed on the drive shaft of the rotor of the pneumatic motor; the arms for firmly holding the rim are pivotably connected to a bearing plate that can be coupled to the driveshaft or housing of the pneumatic motor; and the worm meshes with toothed segments on the pivoting ends of the arms for firmly holding or clamping the rim. Thus, without an additional drive unit such as a pneumatic or hydraulic cylinder, secure retention and clamping of the rim, onto which a tire is to be pulled or from which a tire is to be pulled, is assured.

In a preferred embodiment, a clutch disk is disposed around the driveshaft of the pneumatic motor; the underside of the clutch disk can be frictionally coupled to the housing of the pneumatic motor; screws or tangs that are displaceably guided in bores in the bearing plate are disposed on the top of the clutch disk; and the top of the clutch disk can be coupled to the drive shaft.

In a further feature of the invention, the bores in the bearing plate are through bores; springs acting upon the bearing plate are disposed on the screws; and a ring, serving as a bearing face for the clutch disk, is formed on the worm.

The clutch disk is displaceable between two positions. In the first position, it rests by frictional engagement on the housing of the pneumatic motor, so that the bearing plate with the pivotable arms is firmly held via the screws, while the worm is rotatable via the pneumatic motor. As a result, pivoting of the arms is possible. In the second position, in which the clutch disk is pressed against the ring on the worm via the force of the springs disposed on the screws, the bearing plate, together with the arms formed on it, is rotated with the worm. The coupling between the clutch disk and the worm is likewise effected by frictional engagement.

Preferably, four arms diametrically opposing one another in pairs are pivotably connected to one bearing plate that can be coupled to the driveshaft of the pneumatic motor.

The teeth of the segments are each offset by one-fourth the pitch of the worm. If fewer than four or more than four arms are disposed on the clamping fixture, then the offset of the teeth of the segments is correspondingly greater or less.

The actuation of the clutch disks for coupling the bearing plate to the housing of the pneumatic motor is preferably effected pneumatically, so that all the controls required can be performed with the central compressed air supply system of the tire mounting apparatus.

Rubber elements and clamping claws are disposed on the free ends of the arms, so that a rim can be clamped either from the outside on the wheel flange or from the inside on the rim key.

For easier manipulation, a plate for the rim to rest on is provided on the retaining or clamping fixture, and the rim to be worked on can be placed on this plate. For rims with protruding centering lugs, this plate can be removed.

The pneumatically controlled coupling device enables opening and closing the arms and locking them in the required position while they rotate together with the rim. If the coupling device is supplied with compressed air, a rotational locking of the arms is effected, and by rotation of the pneumatic motor along with the worm, pivoting of the arms either away from or toward one another takes place, in the course of which a rim can be centered and firmly clamped. Once the rim is firmly clamped, the clutch of the coupling device is released, so that the arms can rotate together with the rotor of the pneumatic motor. At the same time, the rotation of the worm is interrupted by decoupling of the corresponding coupling device, so that further pivoting of the clamping arms is terminated. This converts the torque of the pneumatic motor into rotation of the clamped rim.

In accordance with a preferred embodiment, the device for forcing the bead edges into the rim bed is pivotable about a vertical axis; two arms displaceable relative to one another are disposed on a column; levers, on the free ends of which the forcing rollers are supported, are supported on the arms; and piston/cylinder units acting on the levers are provided on the arms. For forcing a tire off a rim during the unmounting of the tire, both forcing rollers are positioned simultaneously in the starting position on the upper and lower side of the tire. Since the forcing force can be brought to bear on the tire while the tire rotates along with the rim, a multiple reduction in the necessary force is possible, compared with conventional tire mounting apparatus.

The arms are preferably displaceable relative to one another on bushings via a pneumatic piston/cylinder unit, a motor-or hand-driven spindle, or the like, so that in the forcing position, the rollers disposed on the forward ends of the arms can be positioned against the sides of the tires. By pivoting the apparatus about the vertical column and by the displacement of the arms on this column in the vertical direction, the forcing device can be adapted to different tire diameters and widths with little effort. When the forcing force is brought to bear via the piston/cylinder units on the levers, on which the rollers are supported, tilting of the bushings on the column takes place, so that no additional provisions need to be made for fixing the arms on the column. When the force exerted is released, i.e., once the forcing force brought to bear is stopped, the arms can again be displaced away from each other into their outset position via a compression spring disposed between them. However, this displacement can also be done via action upon the pneumatic piston/cylinder unit with which the arms are pushed together, if this piston/cylinder unit can be acted upon in two directions. The compression spring is preferably disposed around the vertical column.

In a preferred embodiment, the forcing rollers are embodied conically, and the travel of the various piston/cylinder units that act upon the levers pivotably connected to the arms may be different, so that tires can be mounted on rims having shoulders of various widths.

The arms are preferably unrotatably guided on the column, and the column may be embodied as polygonal in cross section, preferably hexagonal, oval or round with a keyway or groove.

In a preferred embodiment, the center axis of the device for firmly holding the rim is inclined relative to the vertical, so that the mean working height remains constant, regardless of the dimensions of the tire to be changed, and the ergonomics is improved.

Since in a further feature of the invention the element of the device for pulling the bead edges of a tire over a wheel flange is made of a plastic that is gentle to other materials and causes no damage to the rim, the carrier arm on which the element is secured need not be locked, because the element and hence the tool is braced on the rim itself. Thus, the arm on which the element for pulling the beads on or off is disposed can be embodied such that it is movable relatively freely.

BRIEF DESCRIPTION OF THE DRAWINGS

Exemplary embodiments of the invention are described in further detail below, referring to the drawing, in which.

DETAILED DESCRIPTION OF THE EMBODIMENT

Figure 1:
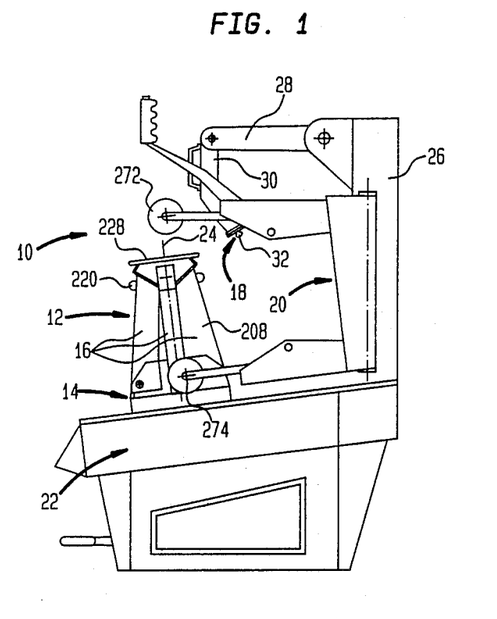
FIG. 1 snows a side view of an apparatus for mounting a tire on a rim or unmounting it according to the present invention.
Figure 2:
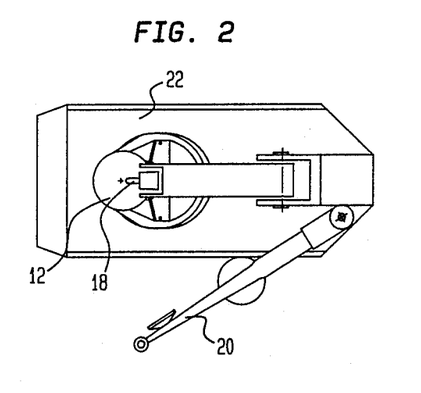
FIG. 2 shows the apparatus of FIG. 1 in a plan view.
Figure 3:
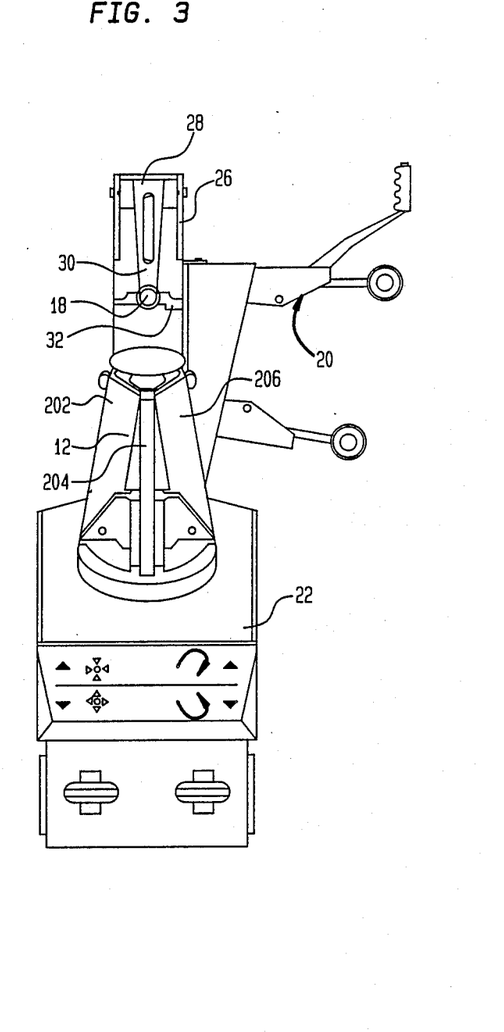
FIG. 3 shows the apparatus of FIG. 2 in a front view.

FIG. 1 shows a side view of an apparatus 10 for mounting a tire on a rim or removing it therefrom. The apparatus 10 has a device 12 for firmly holding or clamping a rim, which is driven by motor 14. Via the motor 14, the device 12 is driven to rotate, and pivoting of arms 16 of the holding or clamping device is effected. A device 18 is also provided for pulling the bead edges of the tire from the rim or pulling them onto the rim. By means of a device 20, the bead edges of the tire are forced into the rim bed. The devices 12, 14, 18 and 20 are disposed on a frame 22. As can be seen from FIG. 1, the device 12 is disposed with its center axis 24 inclined from the vertical, which makes the apparatus easier to manipulate. The motor 14 for driving the clamping and holding device 12 is a pneumatic motor, which will be described in further detail below in conjunction with FIGS. 4-15. The device 20 for forcing the bead edges of a tire into a rim bed will be described in further detail in conjunction with FIGS. 17 and 18.

A column 26 that has a horizontal arm 28 on its upper end is secured to the frame 22. A pivotable arm 30 is supported on the free end of the arm 28 and has an element 32 on its lower, free end for pulling the bead edges from a rim or pulling them onto it. The element 32, which is preferably made of plastic, is supported on the wheel flange of a rim and either thrusts the bead edge over the wheel flange inward into the rim bed, or pulls a bead edge from the rim bed over the wheel flange to the outside, in order to remove a tire from a rim. Since the element 32 is braced on the wheel flange, the arm 30 can be embodied relatively freely movably because no bracing is required, since the element 32 rests directly on the wheel flange.

Figure 4:
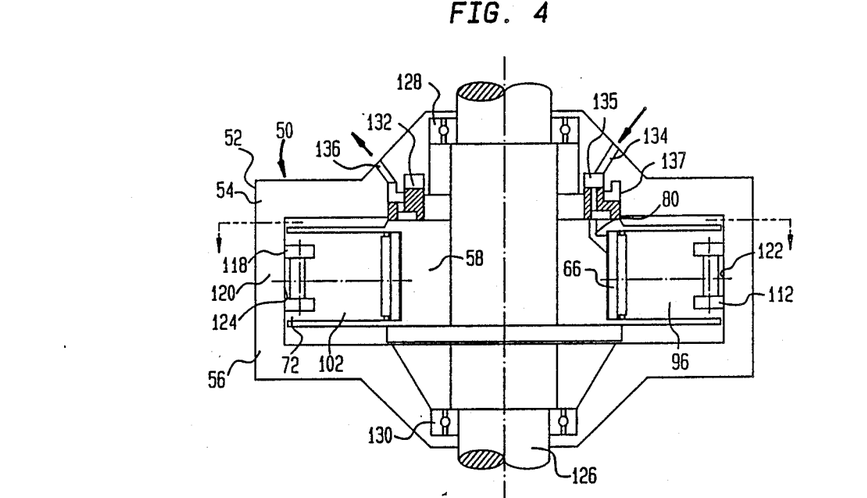
FIG. 4 shows a longitudinal section through a pneumatic motor.
Figure 5:
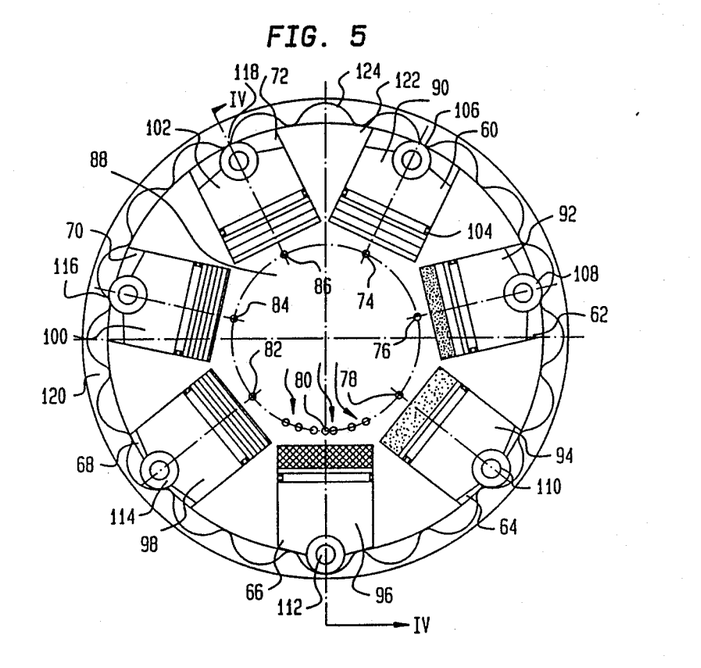
FIG. 5 shows a section along the line V—V of FIG. 4.
Figure 6:
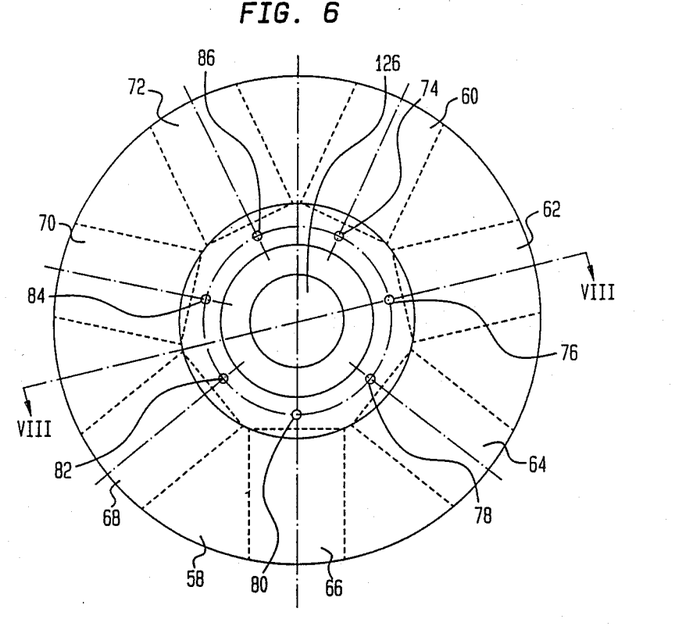
FIG. 6 shows a view onto the top of the cylinder block.
Figure 7:
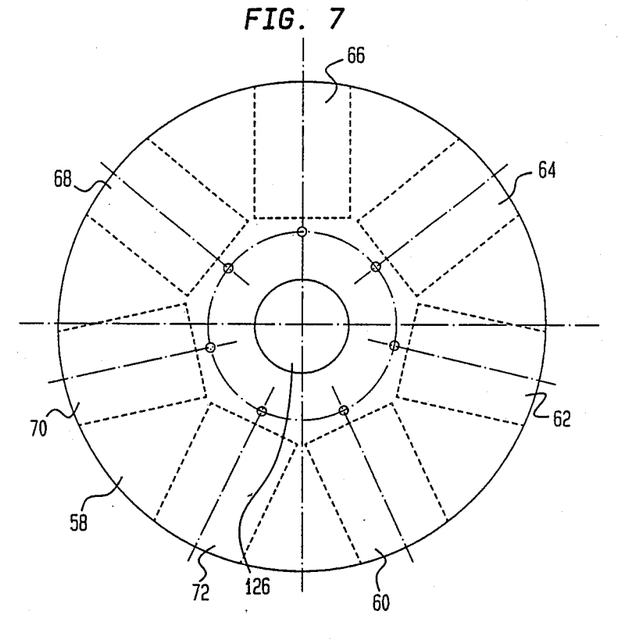
FIG. 7 shows a view onto the underside of the cylinder block of FIG. 6.
Figure 8:
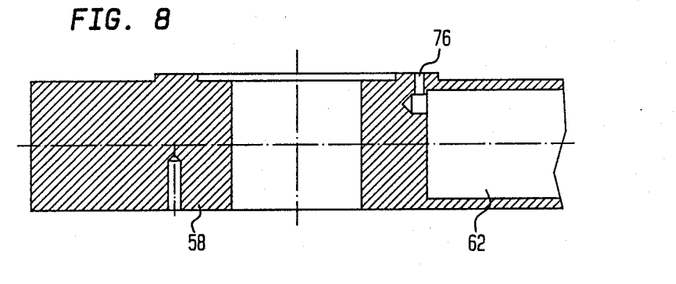
FIG. 8 shows a section taken along the line VIII—VIII of FIG. 6.
Figure 9:
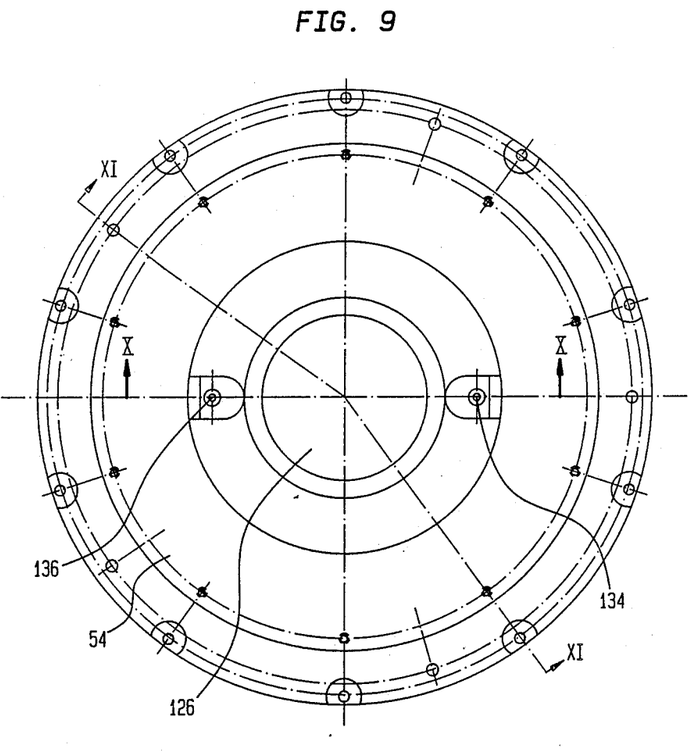
FIG. 9 shows a plan view of the upper half of the stator housing.

FIG. 4 is a longitudinal section through a pneumatic motor 50. The pneumatic motor 50 comprises a stator housing 52 with two housing halves 54, 56. A rotor 58 is disposed inside the stator housing 52. The rotor 58 comprises a block in which seven blind bores 60, 62, 64, 66, 68, 70 and 72 are embodied (see FIG. 5). The blind bores or cylindrical bores 60-72 are radially distributed uniformly in the cylinder block 58. One pressure supply or discharge line 74, 76, 78, 80, 82, 84, 86 is associated with each cylinder 60-72. The openings of the lines 74-86 are located on a circle 88. One piston 90-102 is displaceably guided in each cylinder 60-72. Sealing of the pistons 90-102 is effected via ring seals 104. Rollers 106, 108, 110, 112, 114, 116, 118 are rotatably supported on the radially outer end of the pistons 90-102. The rollers 106-118 travel on a cam ring 120, which is embodied in the interior of the stator housing 52. The cam ring 120 has twenty cam lobes 122 and twenty cam indentations 124. A driving shaft 126 is secured coaxially to the cylinder block 58 and is supported in the stator housing 52 via bearings 128 and 130. The top of the cylinder block 58 slides on the underside of a control device 132, by way of which a frontal supply of compressed air to and discharge thereof from the cylinders 60-72 takes place. The control device 132 has a compressed air supply line 134 and a compressed air discharge line 136. As will be described below, the two lines can be transposed; that is, compressed air can be supplied via the line 136 and discharged via the line 134, which is associated with a reversal in the rotational direction of the rotor 58. If compressed air is introduced into the control device 132 via both the line 134 and the line 136, then all the pistons 90-102 of the cylinders 60-72 are supplied with compressed air, and the rotor is locked in the stator, which brings the pneumatic motor 50 to a stop and locks it.

Figure 10:
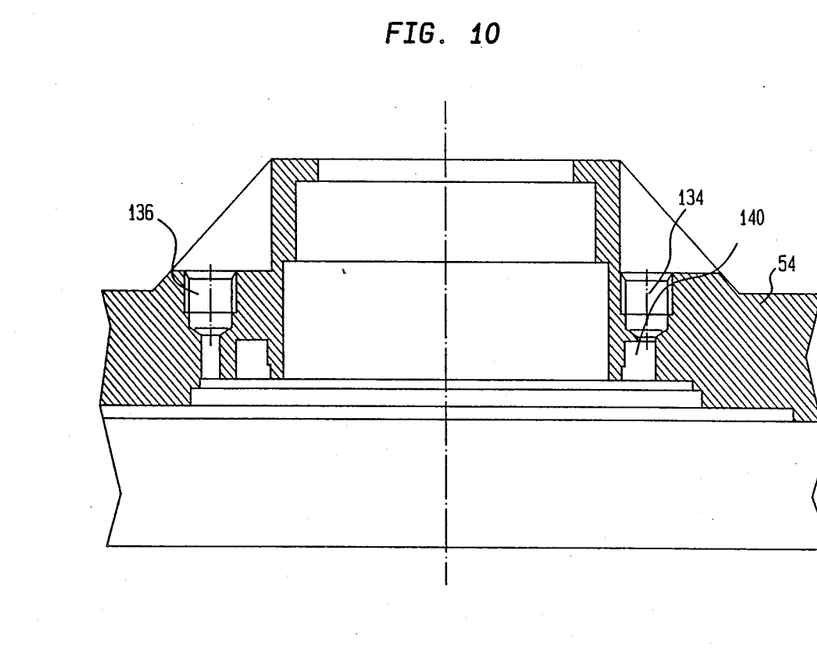
FIG. 10 shows a section taken along the line X—X of FIG. 9 on an enlarged scale.
Figure 11:
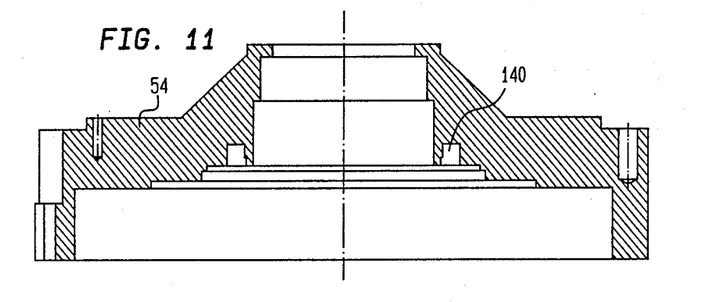
FIG. 11 shows a section taken along the line XI—XI of FIG. 9.
Figure 12:
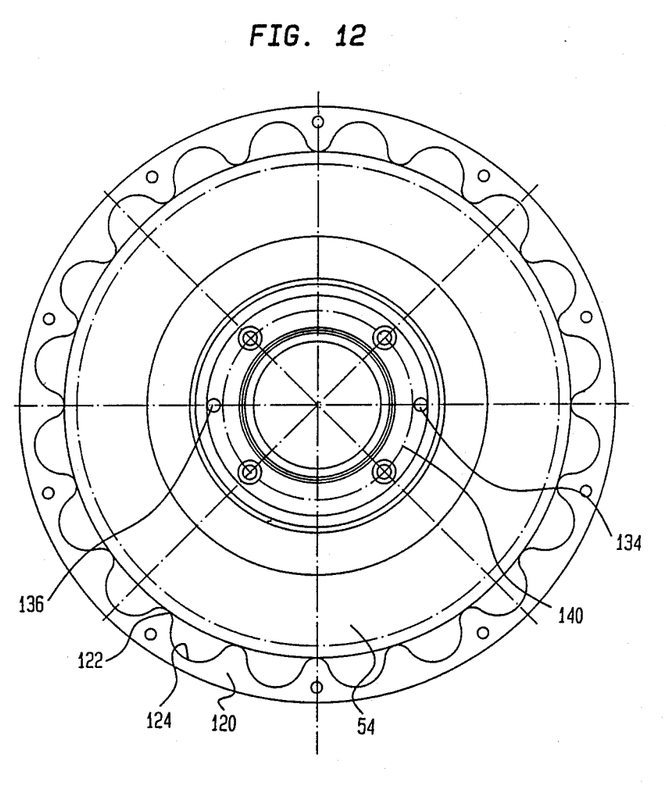
FIG. 12 shows a view onto the underside of the upper half of the stator housing of FIG. 9.
Figure 13:
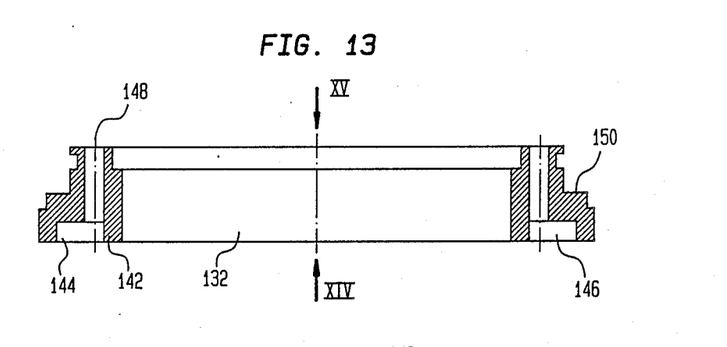
FIG. 13 shows a section through a control unit.
Figure 14:
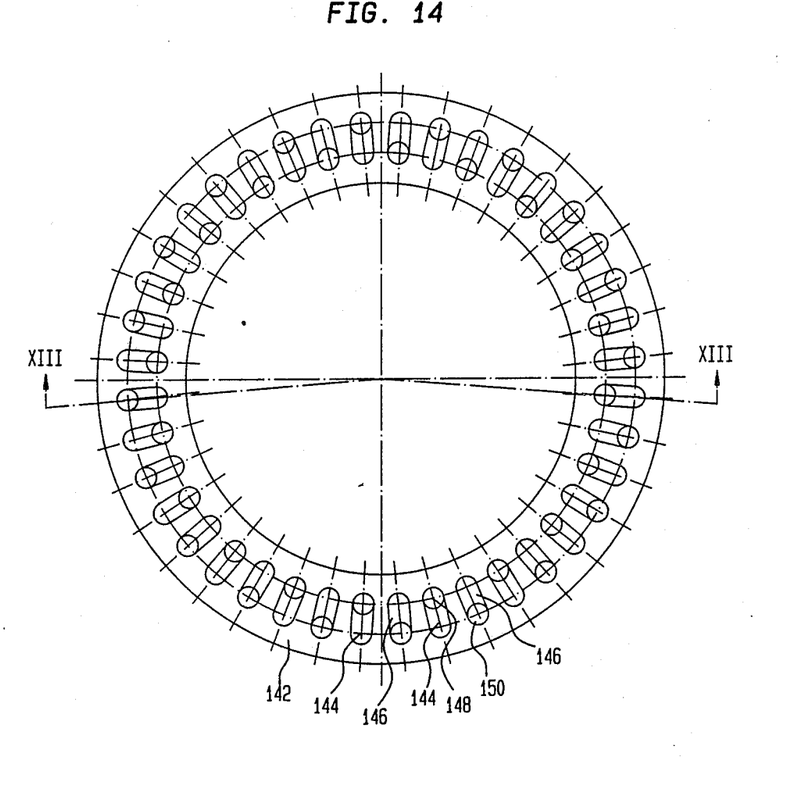
FIG. 14 shows a view in the direction of the arrow XIV of FIG. 13.
Figure 15:
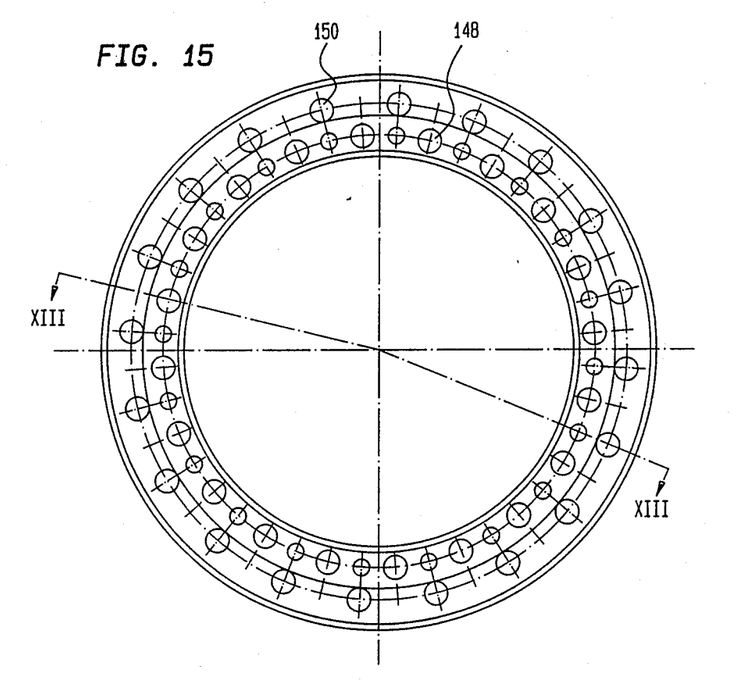
FIG. 15 shows a view in the direction of the arrow XV of FIG. 13.

An annular groove 140 in which the control device 132 is placed is embodied in the upper stator housing half 54 (FIGS. 10, 11). Once the control device 132 is in place in the annular groove 140, an annular groove 135 into which a compressed air supply line opening 134 discharges and an annular groove 137 located radially farther outward and into which a compressed air outlet opening 136 discharges are defined. The control device 132 comprises a ring 142, which has oolong slots 144 and 146 on the side toward the cylinder block 58 (FIGS. 14). From the oblong slots 144, vertical through conduits 148 extend radially inward, upward through the ring 142. From the oblong slots 146, through conduits 150 on the radially outer end extend upward through the ring. Via the oblong slots 144 and the through conduits 148, compressed air is supplied to the supply lines 106-118 of the piston/cylinder units 60-72/90-102, if these units are communicating with the through lines 148. Correspondingly, compressed air is fed via the through opening 150 and the oblong slots 146 into the outlet line 136 from the piston/cylinder units that are communicating with the through lines 150.

During the rotation of the pneumatic rotation motor 50, each piston/cylinder unit 60-72/90-102 communicate alternatively by the corresponding line 74-86, with the air supply line 134 or the air outlet line 136 via the frontal supply system 132. It can be seen from FIG. 5 that the pistons 60, 62, 64 are supplied with compressed air, and their rollers 106, 108, 110 exert pressure on the flanks of the cams 122, 124, so that the rotor 58 runs counterclockwise on the cam ring 120. The piston 96, in contrast, is in its fully extended position; that is, the roller 112 is located at the center point of a cam indentation 124. The piston 96 is reversed; that is, the compressed air is discharged from the cylinder 66, so that the piston 96 is thrust into the cylinder and the roller 112 exerts no pressure on the cam flank. The discharge of compressed air is also effected in the cylinders 68, 70 and 72, since the rollers 114, 116, 118 of the pistons 98, 100, 102 travel on cam flanks, and the pistons are thrust into the interior of the cylinder. The moment generated by all the active pistons effects a drive that is sufficient to perform one complete rotation of the rotor 58 about an angle of 360° and is sufficient in each phase of the motion to assure a torque sufficient to rotate a tire during its mounting or unmounting. The pistons that are in the active phase, in other words, those the rollers of which, under pressure, act upon the descending flanks of the cams in the rotational direction of the rotor, are supplied via the compressed air lines with compressed air, while compressed air is discharged from the other cylinders when the pistons are displaced radially inward.

Figure 16:
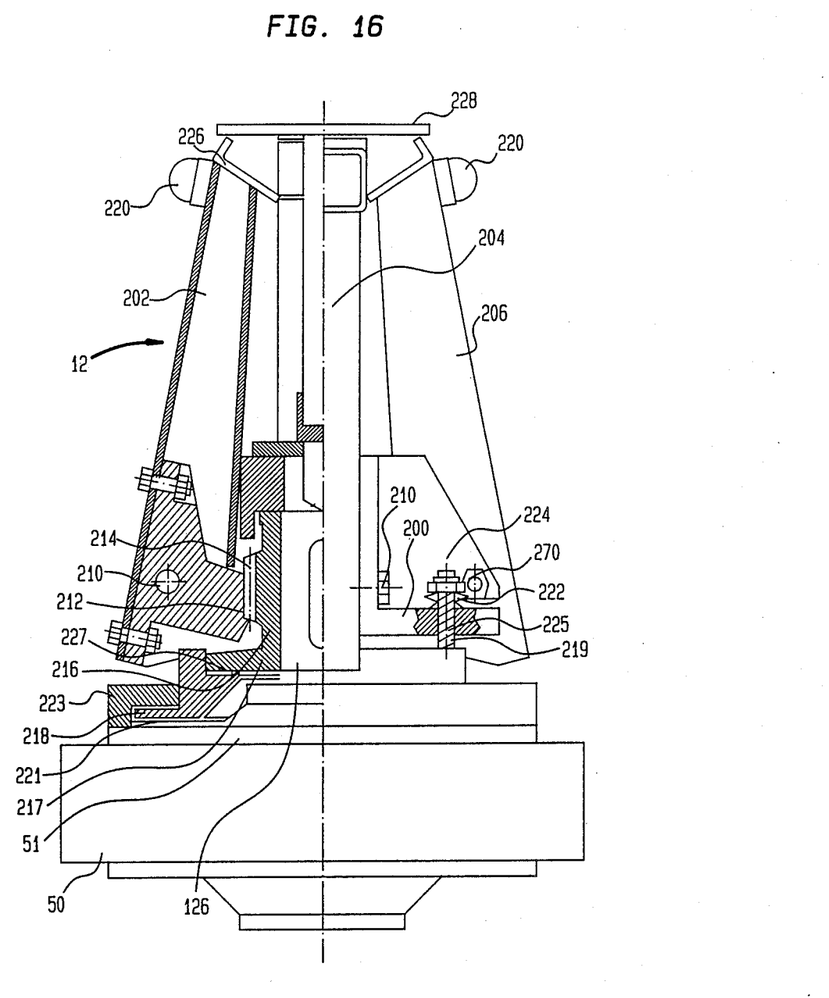
FIG. 16 shows a device for firmly holding a rim, seen in side view, in fragmentary section.

FIG. 16 shows a device 12 for clamping and firmly holding a rim. Four arms 202, 204, 206 and 208 are supported via joints 210 on a bearing plate 200. Each arm is embodied with a toothed segment 212, which meshes with a thread 214 of a worm 216 that is disposed on the driving shaft 126 of the pneumatic motor 50. The teeth of the segment 212 of the arm 202 are offset by one-fourth the pitch of the thread 214 of the worm 216 relative to the teeth of the arm 202. The teeth of the segment of the arm 202, in turn, are offset by one-fourth the pitch height relative to the teeth of the segment on the arm 206, and those in turn are offset by one-fourth the pitch height of the thread 214 of the worm 216 relative to the teeth of the arm 208; this assures that each arm 202-208 will execute the same pivoting motion outward or inward upon rotation of the worm 216.

The clutch disk 218 has a friction lining 221 on its underside, which enables frictional engagement with the housing 51 of the pneumatic motor 50. Coupling of the clutch disk 218 to the housing 51 is effected pneumatically. The clutch disk 218 is guided in a housing ring 223 disposed on the housing 51.

Screws 219 that are guided through bores 225 in the bearing plate 200 are disposed on the top of the clutch disk 218. Dish springs 222 that are disposed surrounding the screws 219 are braced on the top of the bearing plate 200. Via the screws 219, the bearing plate 200 is firmly held stationary whenever the clutch disk 218 is frictionally coupled to the housing 51. In this position of the bearing plate 200, the arms 202-208 can be pivoted via the worm 216 driven by the driving shaft 126 of the pneumatic motor 50.

Once a rim has been clamped by pivoting of the arms 202-208, the pneumatic pressure upon the clutch disk 218 is terminated; the disk then rises, under the influence of the springs 222, and with its top, on which a friction lining 227 is disposed, comes into contact with the underside of a ring 217 that is formed onto the worm 216. Via the screws 225, the bearing plate 200 is carried along whenever the clutch disk 218 rotates together with the worm 216, while the arms 202-208 remain in the position set for them. Thus a rim clamped via the arms is rotated, and a tire can be mounted on a rim or removed from it.

Once the mounting is completed, the pneumatic motor 50 is stopped by supplying both the compressed air supply line and the discharge line with compressed air, and by re-coupling the clutch disk 218 to the housing 51 of the motor 50 and by reversing the supply to the compressed air motor 50, a counterclockwise rotation of the worm 216 is brought about, which is associated with a pivoting of the arms 202-208 toward one another, which in turn release the clamped rim.

In addition to elastic or rubber bodies 220 for fastening a rim on the rim key, fastening hooks 226 are disposed on the top of the arms 202-208, and by means of these hooks the rims can be grasped from the outside on the wheel flange and fastened by pivoting the arms 202-208 inward. A rest plate 228 disposed on the top of the clamping device 12 can be removed, so that rims with protruding centering lugs can also be disposed on the holder or clamping device 12.

The rim holding or clamping fixture requires no additional units for providing force such as piston/cylinder units for actuating clamping jaws; instead, it is actuated via the pneumatic motor. The clamping fixture 12 is preferably inclined from the vertical, so that convenient and unfatiguing work can be done with the apparatus.

Figure 17:
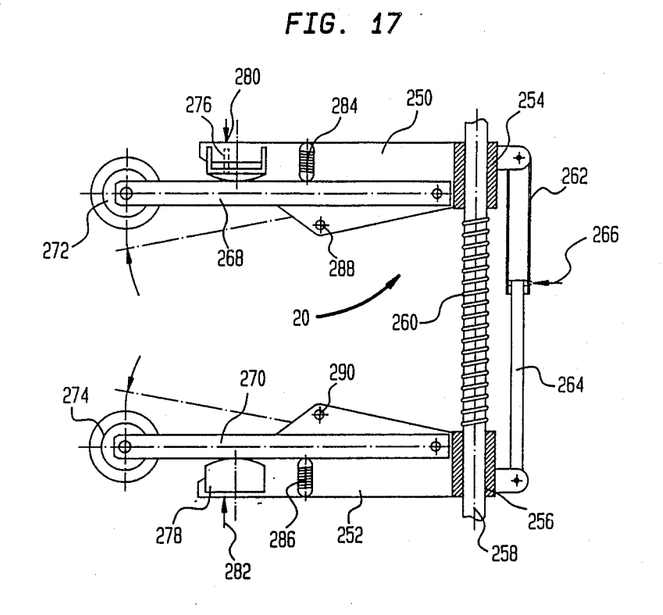
FIG. 17 shows a device for forcing a tire from a rim, seen in a side view.
Figure 18:
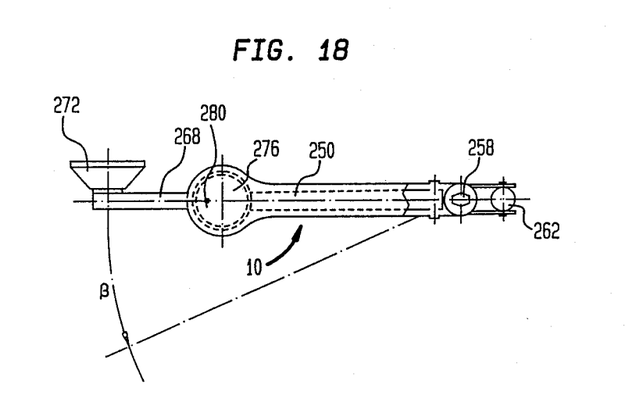
FIG. 18 shows the device of FIG. 17 in a plan view.

FIGS. 17 and 18 show a device 20 for forcing bead edges of a tire into the bed of a rim. The forcing device 20 has two arms 250 and 252, which are supported via bushings 254 and 256, respectively, on a vertically disposed column 258. The column 258 is preferably hexagonal in cross section, to prevent twisting of the arms 250 and 252 on the column 258. A helical spring 260 is disposed between the arms 250 and 252 on the column 258 and presses the arms apart. To enable pulling the arms 250 and 252 toward one another, a cylinder 262 is pivotably connected to the arm 250 and a piston 264 is pivotably connected to the arm 252. The pivotable connection of the piston/cylinder unit 262, 264 is effected as close as possible to the column 258, so that during the actuation of the piston/cylinder unit 262, 264, no tilting moment upon the bushings 254, 256 will occur. The cylinder 262 is supplied with compressed air via a line 266, as a result of which the piston 264 is thrust into the cylinder 262, and the distance between the arms 250, 252 is decreased.

A lever 268 is pivotably connected to the arm 250 and a lever 270 is pivotably connected to the arm 252. A conical roller 272 is supported on the front free end of the lever 268, and a conical roller 274 is supported on the front end of the lever 270. The rollers 272 and 274 are positioned against the sidewalls of the tire, in order to force the tire off of a rim in the immediate vicinity of the wheel flange. The required axial forcing force is brought to bear on the levers 268, 270 via piston cylinder units 276 and 278, which are secured on the arms 250 and 252, respectively. The required compressed air is supplied to the piston/cylinder units 276, 278 via lines 280 and 282, respectively. A return of the levers 268, 270 to their outset position after a forcing operation, once the piston/cylinder units 276, 278 have been retracted, is effected via tension springs 284 and 286. The piston/cylinder units 276 and 278 can execute different lengths of travel and thus may have different pivoting angles of the levers 268, 270, which enables adaptation to rim shoulders of different widths. Stops 288 and 290 limit the maximum pivoting travel of the levers 268 and 270, respectively.

As can be seen from FIG. 18, the device for forcing a tire from a rim can be pivoted with the column 258 around an angle $\beta$, so that on the one hand unhindered placement on it of a tire to be mounted is possible, and on the other, different tire diameters can be taken into account.

The arms 250 and 252 slide with their bushings 254, 256 in a vertical direction on the column 258, actuated via the piston/cylinder unit 262, 264, in order to be adjusted to the width of the tire to be forced off. Pivoting with the column 258 simultaneously enables taking the diameter into account. After moving toward the sidewalls of the tire via the piston/cylinder unit 262, 264, the conical rollers 272, 274 rest on the sidewalls. While the clamped tire is set into rotation via the pneumatic motor, pressure is exerted upon the piston/cylinder units 276, 278, which initiates the forcing of the bead edges from the rim shoulders into the rim bed. Because the tire is rotating, the force required to force the bead edges from the rim can be greatly reduced. By bringing the forcing pressure to bear upon the rollers 272, 274, a moment is generated that pivots the arms 250, 252 and hence the bushings 254, 256 within narrow limits, as a result of which the bushings 254, 256 and the arms are all locked on the column 258. Once the tire has been forced from the rim, the pistons of t he piston/cylinder units 276, 278 are retracted, which undoes the locking of the bushings 254, 256 on the column 258 and moves the arms apart via the force of the spring 260, so that the unit 20 is pivoted outward, and the tire can be removed from the rim by using the pulling device 18.

What is claimed is:

1. An apparatus for mounting a tire on a wheel rim or unmounting it therefrom comprising:
    a pneumatic motor for rotating the rim, said motor having a rotor and a stator and a plurality of radially arranged piston/cylinder units and a plurality of cam indentations disposed on a circle;
    a holding means for firmly holding the rim, comprising self centering expander arms which extend outward the pneumatic motor;
    a pulling means for pulling the bead edges of the tire over a flange of the wheel, said pulling means having an element for bracing against the wheel flange; and
    a means for forcing the bead edge of the tire into the rim bed, said forcing means comprising rollers acting on both beads simultaneously.

2. An apparatus as defined by claim 1, wherein each piston of the pneumatic motor comprises one roller for cooperating with respective ones of said plurality of cams, and wherein the number of said plurality of cams cannot be integrally divided by the number of said plurality of piston/cylinder units, and further comprising a control means for alternatingly supplying and discharging compressed air to or from the cylinders.

3. An apparatus as defined by claim 2, wherein the cylinders are embodied in one block.

4. An apparatus as defined by claim 2, wherein the cam indentations are embodied on an inner circumferential face of a cam housing.

5. An apparatus as defined by claim 2, wherein the piston/cylinder units are disposed on the rotor and the cam indentations are disposed on the stator.

6. An apparatus as defined by claim 4, wherein the control device for supplying and discharging the compressed air to or from the piston/cylinder units is provided on top of the arrangement of piston/cylinder units, and has a number of supply and discharge openings for compressed air disposed on a circle, the number being equal to the number of cams; and annular grooves for supplying or discharging compressed air are embodied in one half of the housing.

7. An apparatus as defined by claim 2, wherein said plurality of piston/cylinder units comprises at least four piston/cylinder units and said plurality of cams comprises three cams.

8. An apparatus as defined by claim 2, wherein said plurality of piston/cylinder units comprises seven piston/cylinder units and said plurality of cams comprises twenty cams, and the control unit has twenty air inlet openings and twenty air outlet openings.

9. An apparatus as defined by claim 2, further comprising a compressed air control unit means for transporting compressed air supply means and compressed air discharge means connected to said cylinders.

10. An apparatus as defined by claim 9, wherein the compressed air supply means and the compressed air discharge means are supplied simultaneously with compressed air.

11. An apparatus as defined by claim 1, further comprising a worm disposed on the driveshaft of the rotor of a pneumatic motor; a bearing plate that is connected to the drive shaft of the pneumatic motor, said bearing plate having the arms for firmly holding the rim pivotably attached thereto; and wherein the worm meshes with toothed segments on pivoting ends of the arms.

12. An apparatus as defined by claim 11, wherein said arms comprise four arms diametrically opposed in pairs and pivotably connected to the bearing plate coupled to the driveshaft of the pneumatic motor.

13. An apparatus as defined by claim 11, wherein said arms comprise four arms diametrically opposed in pairs and pivotably connected to the bearing plate coupled to a housing of the pneumatic motor.

14. An apparatus as defined by claim 11, further comprising a clutch disk disposed around the driveshaft having an underside of the clutch disk coupled via frictional engagement of a housing of the pneumatic motor; screws that are guided displaceably in bores in the bearing plate and disposed on a top of the clutch disk; and wherein the top of the clutch disk is coupled to the driveshaft.

15. An apparatus as defined by claim 14, wherein the bores in the bearing plate are through bores; springs acting upon the bearing plate are disposed on the screws; and a ring is formed onto the worm to act as a bearing face for the clutch disk.

16. An apparatus as defined by claim 11, wherein the teeth of the segments are offset each by one-fourth the axial pitch of the worm.

17. An apparatus as defined by claim 14, wherein actuation of the clutch disk for coupling the bearing plate to the housing of the pneumatic motor is effected pneumatically.

18. An apparatus as defined by claim 14, further comprising rubber elements and clamping claws disposed on the free ends of the actuator arms.

19. An apparatus as defined by claim 14, further comprising a plate located between said actuator arms for the rim to rest on.

20. An apparatus as defined by claim 1, the forcing means forces the bead edges into the rim bed is pivotable about a vertical axis, and comprises two arms displaceable relative to one another are disposed on a column disposed adjacent to said holding means; levers on free ends of which forcing rollers are supported, supported on the arms; and piston/cylinder units acting on the levers disposed on the arms.

21. An apparatus as defined by claim 20, further comprising displacement means for displacing of the forcing rollers relative to one another on bushings.

22. An apparatus as defined by claim 20, further comprising displacement means for said arms which comprise a pneumatic piston/cylinder unit.

23. An apparatus as defined by claim 20, wherein the compression spring is disposed between the arms of the forcing means.

24. An apparatus as defined by claim 23, wherein the compression spring is disposed on the column.

25. An apparatus as defined by claim 20, wherein the forcing rollers are conical.

26. An apparatus as defined by claim 20, wherein the lengths of travel of the pistons of the piston/cylinder units on the arms of the forcing means can be adjusted differently.

27. An apparatus as defined by claim 20, wherein the arms of the forcing means are guided nonrotatably on the column.

28. An apparatus as defined by claim 27, wherein the column is embodied as not round in cross section and resists rotation of said forcing means.

29. An apparatus as defined by claim 1, wherein a center axis of the holding device for firmly holding the rim is inclined from the vertical.

30. An apparatus as defined by claim 1, wherein the element of the pulling device for pulling the bead edges of a tire over a wheel flange is made of plastic.

31. An apparatus as defined by claim 30, wherein said element is secured to a freely movable arm mounted on said apparatus.

32. The apparatus as defined by claim 2 wherein the piston/cylinder units are disposed on the stator and the cam indentations are disposed on the rotor.

* * * * *